United States Patent
Minervino et al.

(10) Patent No.: US 12,006,840 B2
(45) Date of Patent: Jun. 11, 2024

(54) COMPOSITE VANE FOR AN AIRCRAFT TURBINE ENGINE

(71) Applicant: Safran, Paris (FR)

(72) Inventors: Matteo Minervino, Moissy-cramayel (FR); Pierre Jean Faivre D'Arcier, Moissy-cramayel (FR); Damien Bruno Lamouche, Moissy-cramayel (FR); Tony Alain Roger Joël Lhommeau, Moissy-cramayel (FR)

(73) Assignee: Safran, Paris (FR)

( * ) Notice: Subject to any disclaimer, the term of this patent is extended or adjusted under 35 U.S.C. 154(b) by 0 days.

(21) Appl. No.: 18/021,128

(22) PCT Filed: Aug. 9, 2021

(86) PCT No.: PCT/FR2021/051456
§ 371 (c)(1),
(2) Date: Feb. 13, 2023

(87) PCT Pub. No.: WO2022/038323
PCT Pub. Date: Feb. 24, 2022

(65) Prior Publication Data
US 2024/0026792 A1    Jan. 25, 2024

(30) Foreign Application Priority Data
Aug. 17, 2020  (FR) ...................... 2008522

(51) Int. Cl.
*F01D 5/28* (2006.01)
*B29C 45/14* (2006.01)
(Continued)

(52) U.S. Cl.
CPC ........ *F01D 5/282* (2013.01); *B29C 45/14819* (2013.01); *B29D 99/0025* (2013.01);
(Continued)

(58) Field of Classification Search
CPC ................ F03B 13/1845; F03B 13/186; F05B 2220/705; F05B 2230/50; F05B 2240/93;
(Continued)

(56) References Cited

U.S. PATENT DOCUMENTS 8,100,662 B2 *   1/2012   Schreiber .............. B29C 70/202
                                                      416/248
9,194,843 B2 *  11/2015   Newman ................ G01N 29/22
(Continued)

FOREIGN PATENT DOCUMENTS

EP     2224379 A1    9/2010
EP     3093800 A1   11/2016
(Continued)

OTHER PUBLICATIONS

International Patent Application No. PCT/FR2021/051456, International Search Report (with English translation) and Written Opinion, dated Nov. 12, 2021.

*Primary Examiner* — Jesse S Bogue
(74) *Attorney, Agent, or Firm* — Kilpatrick Townsend & Stockton LLP

(57) ABSTRACT

Blower vane for an aircraft turbine engine, the vane comprising a blade connected to a root, the vane being made of a woven fibre-based composite material embedded in a polymeric resin, the vane further comprising a medium for identifying the vane, which is a radio-identification medium, the blower vane being characterised in that it comprises at least a first portion the fibres of which are only electrically conductive fibres, and at least a second portion the fibres of which are formed by a mixture of electrically conductive fibres and non-electrically conductive fibres, and in that the identification medium is located in or on the second portion.

10 Claims, 7 Drawing Sheets

(51) Int. Cl.
  B29D 99/00 (2010.01)
  F01D 5/02 (2006.01)
  B29K 63/00 (2006.01)
  B29K 105/08 (2006.01)
  B29K 223/00 (2006.01)
  B29K 267/00 (2006.01)
  B29K 277/00 (2006.01)
  B29K 307/04 (2006.01)
  B29K 309/08 (2006.01)
  B29L 31/08 (2006.01)

(52) U.S. Cl.
  CPC .......... *F01D 5/021* (2013.01); *B29K 2063/00* (2013.01); *B29K 2105/0845* (2013.01); *B29K 2223/06* (2013.01); *B29K 2267/00* (2013.01); *B29K 2277/10* (2013.01); *B29K 2307/04* (2013.01); *B29K 2309/08* (2013.01); *B29L 2031/08* (2013.01); *F05D 2220/36* (2013.01); *F05D 2230/23* (2013.01); *F05D 2300/603* (2013.01)

(58) Field of Classification Search
  CPC ............ F05B 2250/132; F05B 2260/04; F05B 2260/503; F05B 2260/505; F05B 2260/64; Y02E 10/30; B29C 45/14819; B29C 70/48; B29C 70/86; B29C 70/865; B29C 70/882; B29D 99/0025; B29D 99/0028; B29K 2063/00; B29K 2105/0845; B29K 2223/06; B29K 2267/00; B29K 2277/10; B29K 2307/04; B29K 2309/08; B29L 2031/08; F01D 17/02; F01D 21/003; F01D 5/021; F01D 5/282; F05D 2220/36; F05D 2230/23; F05D 2260/80; F05D 2300/224; F05D 2300/603; G06K 19/02; G06K 19/07758; G06K 19/07771; G06K 19/07773; Y02T 50/60

See application file for complete search history.

(56) References Cited

U.S. PATENT DOCUMENTS

| | | | |
|---|---|---|---|
| 2009/0188324 A1 | 7/2009 | Gregory et al. | |
| 2009/0208721 A1* | 8/2009 | Tsuchiya | B29C 45/14786 264/250 |
| 2012/0034096 A1* | 2/2012 | Appleton | H01Q 17/00 428/196 |
| 2013/0028744 A1* | 1/2013 | Nordin | F15D 1/12 428/113 |
| 2016/0230568 A1* | 8/2016 | Sippel | B32B 18/00 |
| 2016/0253586 A1* | 9/2016 | Cook | C25D 1/20 428/626 |
| 2020/0166431 A1* | 5/2020 | Schleif | F01D 17/06 |
| 2021/0162638 A1* | 6/2021 | Takahashi | B29C 45/0005 |
| 2022/0282625 A1* | 9/2022 | Lhommeau | F01D 17/20 |

FOREIGN PATENT DOCUMENTS

| | | |
|---|---|---|
| EP | 3211366 A1 | 8/2017 |
| WO | 2021008842 A1 | 1/2021 |

\* cited by examiner

[Fig.1]
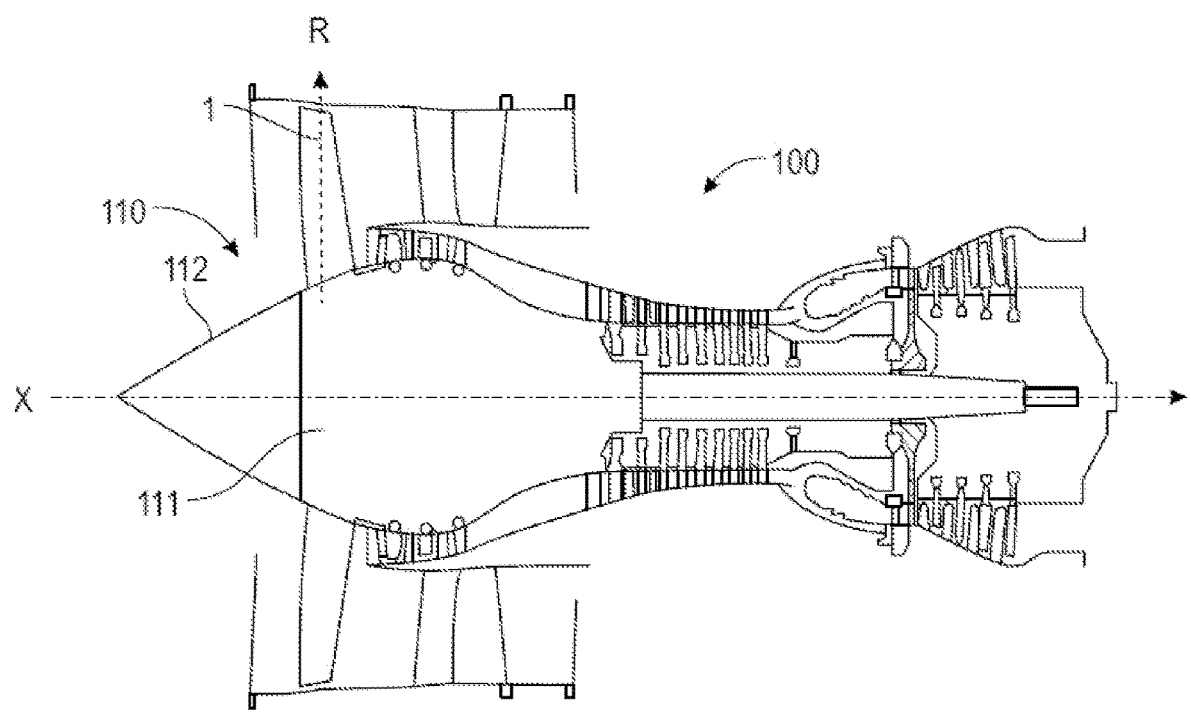

[Fig.2]
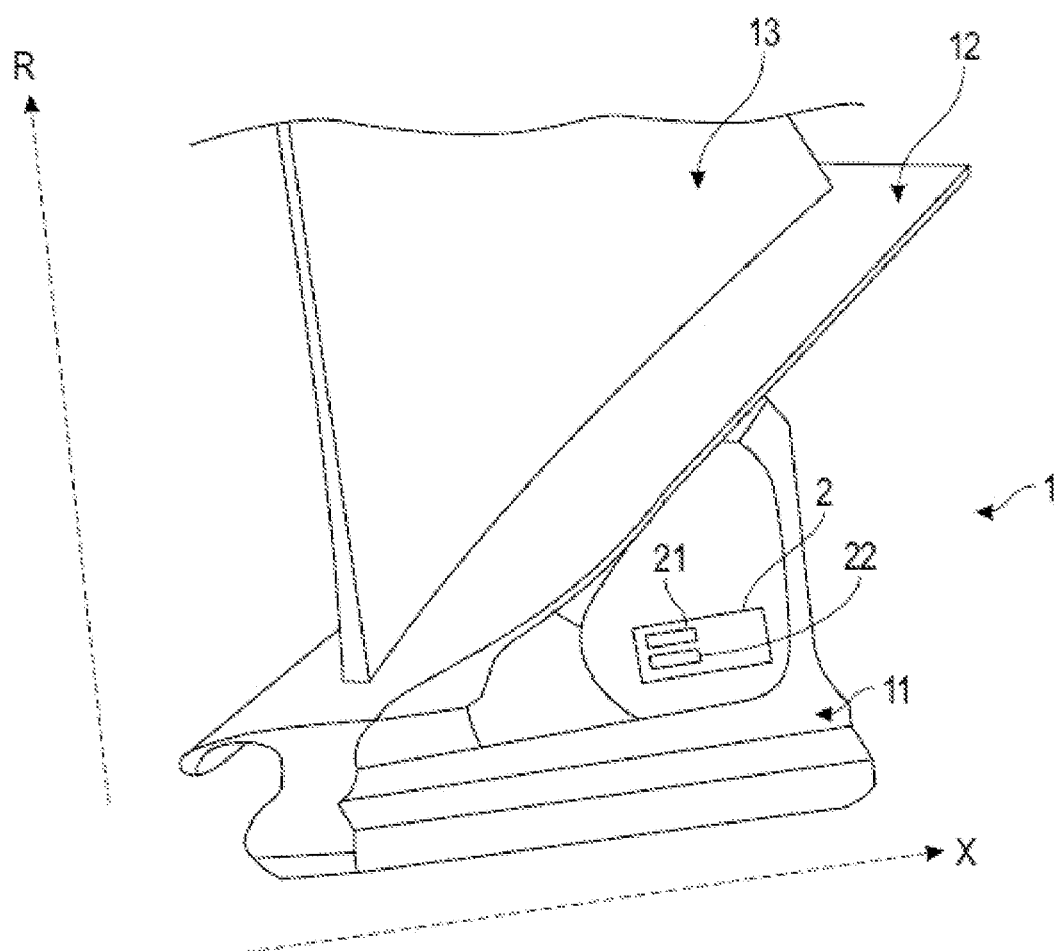

[Fig.3]
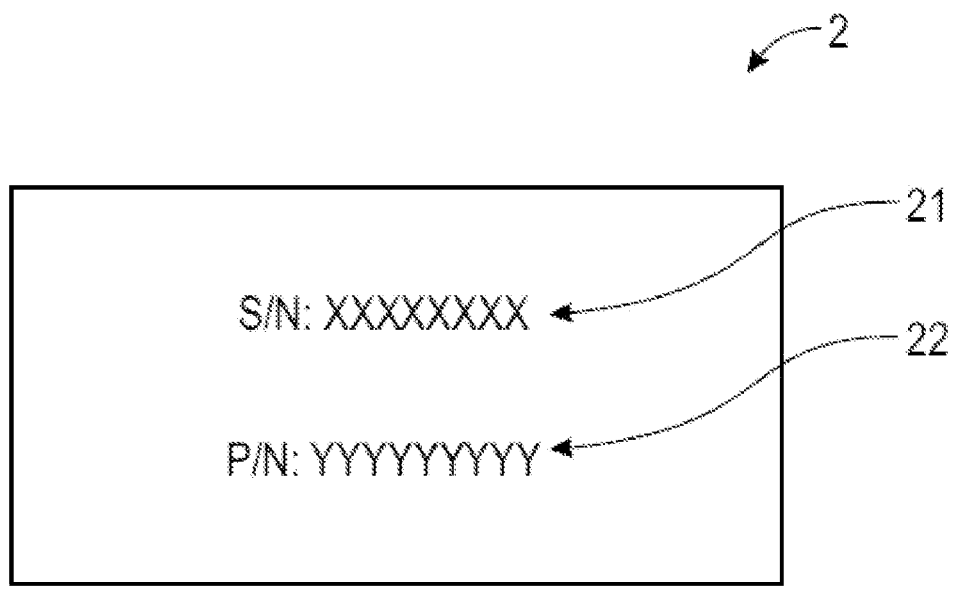

[Fig.4]
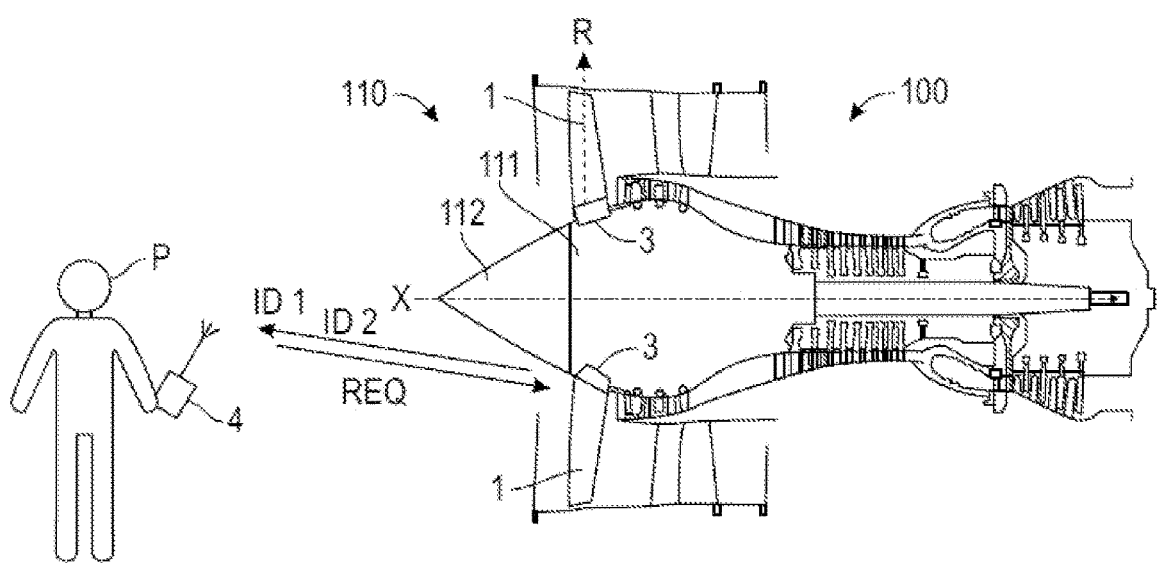

[Fig.5]
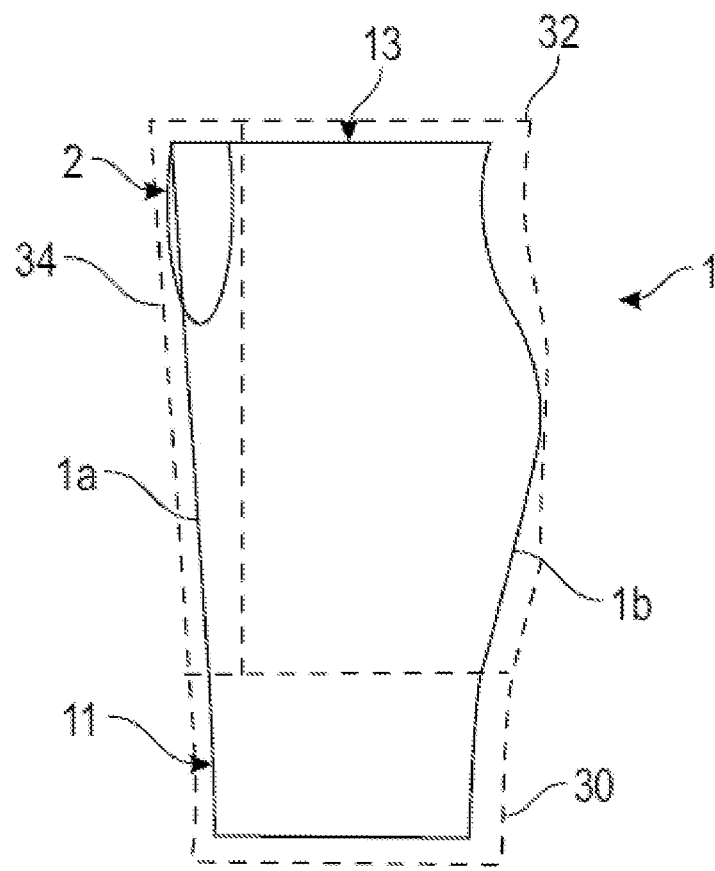

[Fig.6]
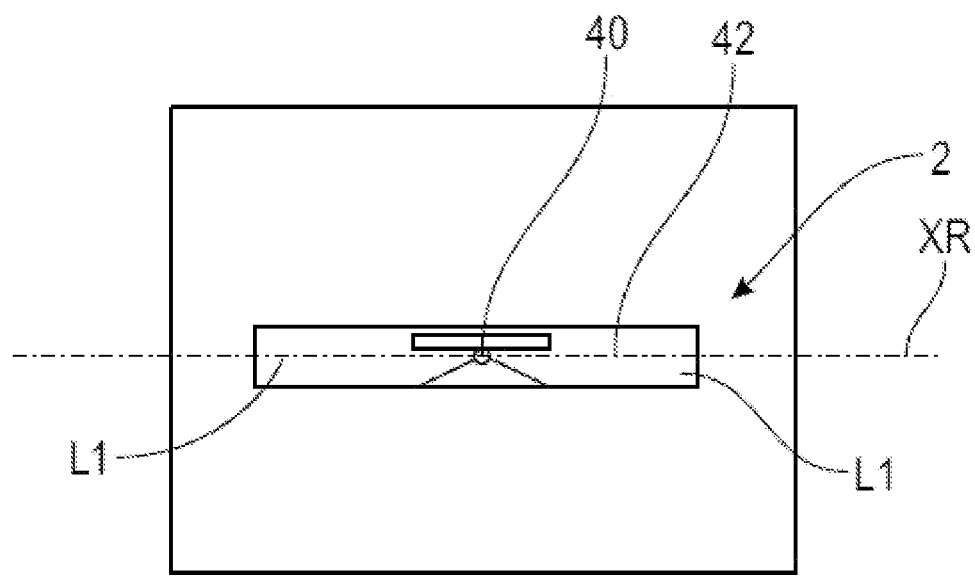

[Fig.7]
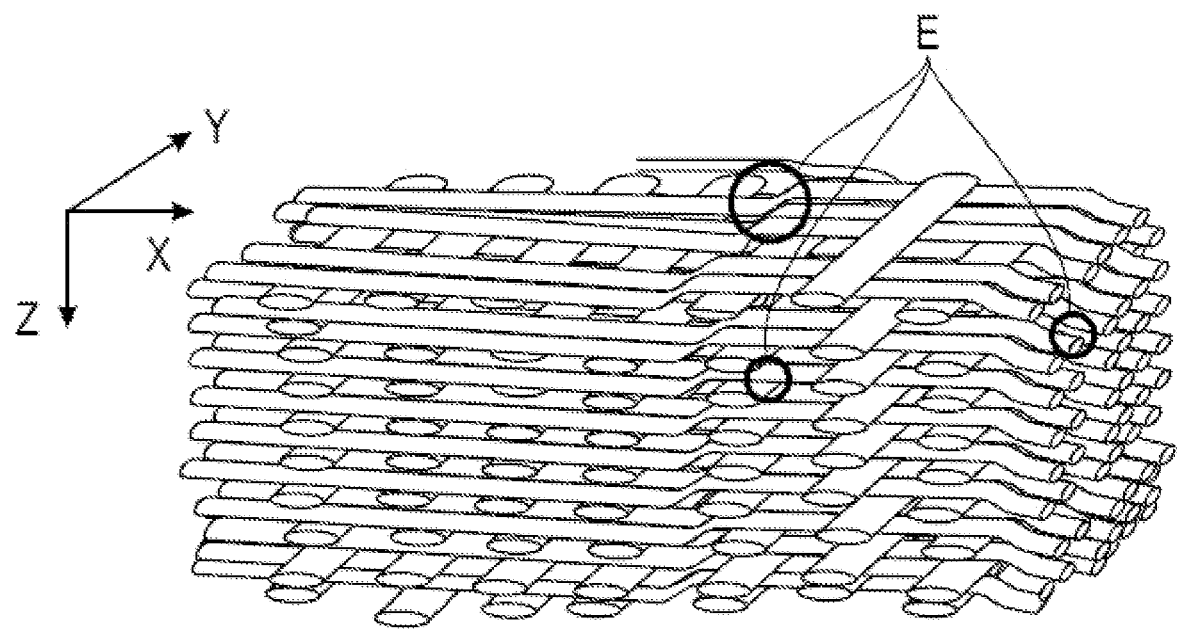

COMPOSITE VANE FOR AN AIRCRAFT TURBINE ENGINE

CROSS REFERENCE TO RELATED APPLICATIONS

This application is the national phase application of International Patent Application PCT/FR2021/051456 ("the '456 application"), filed on Aug. 9, 2021 and titled "COMPOSITE VANE FOR AN AIRCRAFT TURBINE ENGINE," which application is related to and claims priority benefits of France Patent Application No. 2008522 ("the '522 application"), filed on Aug. 17, 2020. The '456 and '522 applications are hereby incorporated in their entireties by this reference.

TECHNICAL SCOPE OF THE INVENTION

The present invention relates to a composite vane for an aircraft turbine engine and to a method of manufacturing the same.

TECHNICAL BACKGROUND

The prior art includes, in particular, the documents EP-3 211 366, EP-3 093 800 and US-2009/188324.

In a known manner, with reference to FIG. 1, there is shown a turbine engine 100 extending along a turbine engine axis X and enabling the aircraft to be moved from an air flux entering the turbine engine 100 and flowing from upstream to downstream. Hereafter, the terms "upstream" and "downstream" are defined in relation to the turbine engine axis X oriented from upstream to downstream. Similarly, the terms "inner" and "outer" are defined along a radial direction R defined with respect to the axis X.

In a known manner, the turbine engine 100 comprises a compressor, a combustion chamber and a turbine for driving the compressor in rotation. The turbine engine 100 comprises an upstream fan 110 which accelerates the airflow from upstream to downstream in the turbine engine 100.

The fan 110 comprises a disc 111, rotationally fixed to a shaft of the compressor, comprising housings, distributed around the periphery of the disc 111, in which vanes 1 are respectively mounted by axial insertion along the turbine engine axis X from upstream to downstream. The vanes 1 extend in the same plane transverse to the turbine engine axis X. In this example, the turbine engine 100 comprises a cone 112 which is mounted upstream of the disc 111.

Preferably, with reference to FIG. 2, each vane 1 extends radially along an axis R with respect to the turbine engine axis X and comprises successively a radially inner mounting root 11 configured to be mounted in one of the said housings of the disc 111, a radial blade of air deflection 13, radially outer, and possibly a platform 12 for connecting the root 11 to the blade 13. Alternatively, the platforms 12 could be dissociated from the vanes 1 and mounted on the disc 111 independently of the mounting of the vanes on this disc.

In a known manner, each fan vane 1 is uniquely identified by a serial number SN and a part number PN. With reference to FIGS. 2 and 3, the serial number 21 and version number 22 are written on a medium 2, preferably fabric, which is attached to a part of the root 11 and covered with a protective coating.

In practice, the fan 110 of a turbine engine 100 must be equipped with adequate fan vanes 1 for the turbine engine 100 to operate optimally. In particular, it is necessary to ensure that the vanes 1 of the same fan 110 have compatible serial numbers 21 and version numbers 22.

A problem arises for companies that lease turbine engine to customers as customers may need to replace one or more vanes 1 of the fan 110 during the lease period. Upon return of the turbine engine, it is the responsibility of the lessor to verify that the vanes 1 that are mounted in the fan 110 are compatible before the turbine engine can be leased again.

Checking the serial numbers 21 and version numbers 22 of the vanes 1 of a fan 110 is particularly tedious and time consuming. In order to visually access the medium 2 comprising the serial number 21 and version number 22, an operator must dismantle the upstream part of the turbine engine, in particular, the fan cone 112, a shell, locks and shims before accessing the vanes 1.

After reading the serial number 21 and version number 22, the operator has to reassemble the upstream part of the turbine engine, which is time consuming and increases the risk of damage and assembly error (non-conformity). In addition, such a method does not protect the operator from mistakenly entering the serial numbers 21 and version numbers 23.

Incidentally, in another application, it is known in the prior art by patent application EP-A1-2 224 379 to use a radio-identification medium, better known by its English acronym RFID, on a compressor vane in order to track its status during the operation of the turboshaft engine. For this purpose, an RFID reader is provided in the turboshaft engine to read the RFID medium over time. Such teaching is not relevant to an operator seeking to identify a vane from outside the turboshaft engine. This is because the turboshaft engine has many metal parts that provide electromagnetic shielding and form a Faraday cage.

The Applicant has already proposed a solution to this problem by means of a fan vane equipped with a radio-identification medium which is glued to the root of the vane.

The present invention proposes an improvement to this technology which, in particular, optimises the detection of the identification medium of the vane.

SUMMARY OF THE INVENTION

The invention relates to a fan vane for an aircraft turbine engine, the vane comprising a blade connected to a root, the vane being made of a composite material based on woven fibres and embedded in a polymeric resin, the vane further comprising a medium for identifying the vane, which is a radio-identification medium, characterised in that it comprises at least a first portion, the fibres of which are only electrically conductive fibres and at least a second portion, the fibres of which are formed by a mixture of electrically conductive fibres and non-electrically conductive fibres, and in that the identification medium is located in or on said second portion.

Commercially available identification medium of the radio frequency identification (RFID) type are of various designs. They are simple and inexpensive to procure, but the performance of the identification chain is highly dependent on the environment in which the medium is placed and how the medium is designed.

There are two known families of RFID medium:
 a so-called "metal" medium, the thickness of which is at least 1.5 mm to operate at high frequency or UHF (ultra-high frequency),
 a "non-metal" or non-conductive medium, the thickness of which is less than 0.5 mm for a UHF application.

It is therefore understood that a non-metallic RFID medium is advantageous because of its small thickness, and its application is particularly interesting for a vane which has a thin thickness imposed by the aerodynamic constraints.

A very important feature for maximising the detection distance of this medium by a suitable reading device is to place the medium in an electrically insulating medium. However, the proximity of a conductive element can interfere with the operation of the medium. The organic resin used for the manufacture of the fan vanes is by its nature insulating, whereas the carbon used for the weaving fibres of its preform is a good electrical conductor.

The positioning of the identification medium in a place rich in non-electroconductive fibres reduces the dissipation induced by the electroconductive carbon fibres and increases the detection distance from a few centimetres (10 to 20 cm) to a few metres (2 to 10 m). In addition, to ensure that the medium is not a detrimental effect on the mechanical behaviour of the composite, the choice of the model and the position of the medium in the vane are preferably carefully defined. The identification medium is integrated into the vane and thus protected from the external environment.

This solution also allows to position the medium as far away as possible from the fan cone of the engine (which is another disturbance element for the RFID signal), but without impacting the aerodynamic surface of the vane.

The vane according to the invention may comprise one or more of the following features, considered independently of each other or in combination with each other:
 the identification medium comprises a ball and a metallic radio antenna, the ball being located in a space between woven fibres; the identification medium is then located entirely within a resin pocket, allowing the medium not to affect the integrity of the vane,
 the ball is non-metallic, e.g. polymer,
 the antenna is planar,
 the ball is entirely embedded in the polymeric resin,
 the ball has a diameter less than or equal to 5 mm, and the antenna has a thickness less than or equal to 0.5 mm,
 the electrically conductive fibres are carbon fibres and the non-electrically conductive fibres are glass or thermoplastic fibres, selected for example from aramid, polyethylene and polyester fibres,
 said second portion extends along a trailing edge of the blade.
 the resin of the vane is a thermosetting or thermoplastic resin,
 the resin of the vane is an epoxy or bismaleimide resin,
 the identification medium is configured to operate at a frequency between 860 and 930 MHz.

The present invention also relates to an aircraft turbine engine, comprising a fan comprising a disc carrying fan vanes, at least one such fan vane being as described above.

The present invention further relates to a method of manufacturing a vane as described above, wherein it comprises the steps of:
 a) inserting at least one preform of woven fibres and the identification medium into a mould, said at least one preform being made from electrically conductive fibres and non-electrically conductive fibres, the identification medium being located in an area of the preform comprising non-electrically conductive fibres, and
 b) injecting resin into the mould so as to simultaneously embed the preform and the identification medium.

BRIEF DESCRIPTION OF THE FIGURES

Other features and advantages of the invention will become apparent in the course of the detailed description which follows, for the understanding of which reference is made to the annexed drawings in which:

FIG. 1 is a schematic representation in longitudinal section of a turbine engine according to the prior art;

FIG. 2 is a schematic representation of a fan vane with an identification medium according to the prior art;

FIG. 3 is a schematic representation of the identification medium of FIG. 2;

FIG. 4 is a schematic representation of a step for reading an RFID-type identification medium of a fan vane of a turbine engine;

FIG. 5 is a schematic representation of a fan vane with an identification medium according to the invention;

FIG. 6 is a schematic representation of an identification medium; and

FIG. 7 is a schematic representation of a piece of woven preform in which an identification medium is positioned.

DETAILED DESCRIPTION OF THE INVENTION

FIGS. 1 to 3 have already been described in the foregoing.

With reference to FIG. 4, there is shown a turbine engine 100 extending along a turbine engine axis X and enabling the aircraft to be moved from an airflow entering the turbine engine 100 and flowing from upstream to downstream. Hereafter, the terms "upstream" and "downstream" are defined in relation to the turbine engine axis X oriented from upstream to downstream. Similarly, the terms "inner" and "outer" are defined along a radial direction R defined with respect to the axis X. In a known manner, the turbine engine 100 comprises a compressor, a combustion chamber and a turbine for driving the compressor in rotation. The turbine engine 100 comprises an upstream fan 110 which accelerates the airflow from upstream to downstream in the turbine engine 100.

The fan 110 comprises a disc 111, rotationally fixed to a shaft of the compressor, comprising housings, distributed around the periphery of the disc 111, in which are respectively mounted vanes 1 by axial insertion along the turbine engine axis X from upstream to downstream. The vanes 1 extend in the same plane transverse to the turbine engine axis X. For the sake of clarity and conciseness, only one vane 1 will be shown from now on. In this example, the turbine engine 100 has a cone 112 which is mounted upstream of the disc 111.

Each vane 1 extends along a radial axis R and comprises successively a mounting root 11 configured to be mounted axially along a turbine engine axis X in a housing of the disc 111 of the fan 110, an air deflection blade 13 extending radially along the radial axis R with respect to the turbine engine axis X, and optionally a platform 12 for connecting the blade 13 to the root 11. The vane 1 extends radially in the mounted position. The mounting root 11 is thus described as radially inner while the air deflection blade 13 is described as radially outer.

The vane 1 is made of a composite material comprising a plurality of fibres embedded in a polymeric resin. According to the invention, some of the fibres are electrically conductive (and referred to as electrically conductive fibres) and other fibres are electrically non-conductive (and referred to as non-electrically conductive fibres). The polymeric resin is not electrically conductive.

The conductive fibres are preferably metal fibres and in particular carbon fibres.

The non-conductive fibres are preferably glass fibres or thermoplastic fibres (aramid, polyethylene, polyester, etc.).

The fibres are woven together to form at least one preform which is intended to be embedded in the resin.

The resin is in this example thermosetting but it could be of a different nature. It could be an epoxy or bismaleimide resin.

FIG. 5 shows an example of a fan vane 1 according to a preferred embodiment of the invention.

The vane 1 comprises a root 11 and a blade 13, as described above. The root 11 of the vane 1 is here formed from a preform or part 30 of a preform, which comprises only woven carbon fibres. This is also the case for a major part of the blade 13 and in particular its leading edge 1b, which is made from a preform or part 32 of a preform, which thus comprises only carbon fibres. The preform is generally single and extends into both parts 30, 32.

In contrast, the portion of the blade 13 extending along the trailing edge 1a is made by weaving carbon fibres and glass fibres and therefore comprises a preform or part 34 of a preform of hybrid material.

The parts 30-34 are delimited by rectangles in dotted lines in FIG. 5.

According to the invention, the identification medium 2 of the RFID-type is preferably located in the part 34 and thus in the vicinity of the trailing edge 1a of the vane in the example shown. This is particularly advantageous as it facilitates the detection of the medium 2 from a distance by a reading device 4, as illustrated in FIG. 4. The identification medium 2 is preferably configured to be detected and operated at a frequency between 860 and 930 MHz.

FIG. 6 illustrates a preferred example of an identification medium 2 for use in the present invention.

This identification medium 2 comprises a ball 40 associated with a metallic radio antenna 42, for example planar. The most bulky element of the medium 2 is the ball 40, which preferably has a diameter of 5 mm or less. The antenna 42 is planar and may extend parallel to a surface of the vane 1 or the blade 13, or between two plies or webs of fibres of the preform. This antenna 42 has, for example, a thickness less than or equal to 0.5 mm.

This type of medium 2 has the advantage of meeting the dimensional, thermal stability and chemical compatibility requirements in the field. Furthermore, the materials of the medium are preferably chosen so as to:
not affect the resin and its polymerisation,
be thermally stable during the possible curing of the resin-impregnated preform or the exothermic polymerisation reaction of the resin,
not disturb the weaving and the preform at the time of closing of the manufacturing mould of the vane, and
it is not too bulky.

The ball 40 is for example made of polymer, and the antenna 42 is for example made of copper or aluminium and covered with a thermoplastic or epoxy polymer (PET, PC, etc.).

The identification medium 2 has a storage memory in the ball 40 in which identification and characterisation data can be stored, for example a serial number (ID1) known as "serial number SN" and a version number (ID2) known as "part number PN". It goes without saying that the storage memory 40 could store a single data item or a set of data items such as, for example, a unique identifier which would allow to identify a part in a particular way, or more than two identification data items such as a manufacturer's identifier (CAGE code, etc.), a date of manufacture, a degree of sensitivity to specific fluids, an operating authorisation reference, data linked to the maintenance or logistical operations of the part, such as its operational status, the operations carried out, etc. The antenna 42 of the identification medium 2 is configured to receive a read request REQ and to transmit in return the identification data ID1, ID2. The identification medium 2 may comprise a battery or be remotely powered. Such an identification medium 2 is known to the skilled person.

In a known way, among the identification media of the radio identification type, a distinction is made between those intended for "non-metallic" use, those intended for "metallic" use and those intended for "mixed" use. Preferably, the identification medium 2 is intended for "non-metallic" use.

According to the invention, the antenna 42 comprises at least one communication lobe L1 oriented along a radio axis XR for receiving the read request REQ and transmitting back the identification data ID1, ID2. As illustrated in FIG. 6, the antenna 42 may in particular comprise two communication lobes L1 aligned along a same radio axis XR. Such an identification medium 2 can thus be used in two opposite directions, along the same direction.

FIG. 7 illustrates part of a woven preform of a vane 1 according to the invention and shows that spaces E exist in this preform to accommodate the metallic ball 40 of the identification medium 2. These spaces E are located between woven fibres and it is understood that the ball 40, housed in one of these spaces, is intended to be embedded in the polymeric resin which impregnates the preform and therefore to be entirely embedded in the polymeric resin.

The invention also provides a method of manufacturing a vane 1 as described above, wherein it comprises the steps of:
a) inserting at least one preform of woven fibres and the identification medium into a mould, the preform being made from electrically conductive fibres and non-electrically conductive fibres, the identification medium being located in an area of the preform comprising non-electrically conductive fibres, and
b) injecting resin into the mould so as to simultaneously embed the preform and the identification medium.

With reference to FIG. 4, a method for individually and collectively reading the identification data ID1, ID2 of the vanes 1 of a fan 110 of a turbine engine 100, in particular, an aircraft turboshaft engine, will now be presented.

In this example, an operator P uses a reading apparatus by radio identification 4, known per se to the person skilled in the art, and places himself at a distance from the turbine engine 100, in particular, upstream of the latter so as to be close to the fan 110.

Using a reading apparatus by radio identification 4, the operator P radio transmits a read request REQ which is radio received by the antenna 42 of the identification medium 2.

In response to the REQ read request, the antenna 42 of the identification medium 2 radio transmits the identification data ID1, ID2 which are read by the reading apparatus by radio identification 4. In particular, the identification data ID1, ID2 are transmitted by the communication lobes L1 of the antenna. The identification data ID1, ID2 read are stored in a computerized manner in the reading apparatus by radio identification 4.

With the invention, an operator P can conveniently, quickly and without risk of error obtain the identification data ID1, ID2 of a vane 1. Furthermore, there is no need to dismantle the upstream part of the turbine engine 100 as in the prior art.

Depending on the transmitting power of the reading apparatus by radio identification 4 and the distance between the reading apparatus by radio identification 4 and the identification medium 2, an operator may read one identification medium 2 of a vane 1 individually (low power and small distance) or a plurality of identification medium 2 of the vanes 1 of a fan 110 collectively (high power and large distance). In practice, a reading can be taken from a distance greater than 1 or 2 m.

The present invention has several advantages, including:
- there is no additional specific step to install the identification medium 2 because its integration is provided during the manufacture of the vane, before the injection of the resin into the manufacturing mould of the vane;
- the identification medium 2 is integrated into the vane and is therefore tamper-proof; it cannot be removed without risk of damaging the vane 1;
- the medium 2 is embedded in the polymeric resin and there is therefore no risk of this medium becoming detached and accidentally lost during operation; and;
- detection of the medium 2 without removal of the engine or the vane;
- the antenna 42 of the identification medium also has the advantage: to be thin and therefore easily positionable and integrable compared to a metallic antenna which is generally thicker and more bulky; and to facilitate detection by a reading device 4.

The invention claimed is:

1. A fan vane for an aircraft turbine engine, the vane comprising a blade connected to a root, the vane being made of a composite material based on woven fibres and embedded in a polymeric resin, the vane further comprising a medium for identifying the vane, which is a radio-identification medium, characterised in that it comprises at least a first portion, the fibres of which are only electrically conductive fibres and at least a second portion, the fibres of which are formed by a mixture of electrically conductive fibres and non-electrically conductive fibres, and in that the identification medium is located in or on said second portion.

2. The vane according to claim 1, wherein the identification medium comprises a ball and a metallic radio antenna, the ball being located in a space between woven fibres.

3. The vane according to claim 2, wherein the ball is entirely embedded in the polymeric resin.

4. The vane according to claim 2, wherein the ball has a diameter less than or equal to 5 mm, and the antenna has a thickness less than or equal to 0.5 mm.

5. The vane according to claim 1, wherein the electrically conductive fibres are carbon fibres and the non-electrically conductive fibres are glass or thermoplastic fibres, selected for example from aramid, polyethylene and polyester fibres.

6. The vane according to claim 1, wherein said second portion extends along a trailing edge of the blade.

7. The vane according to claim 1, wherein the resin is a thermosetting or thermoplastic resin.

8. The vane according to claim 1, wherein the identification medium is configured to operate at a frequency between 860 and 930 MHz.

9. An aircraft turbine engine, comprising a fan comprising a disc carrying fan vanes, at least one of these fan vanes being as defined in claim 1.

10. A method of manufacturing the vane according to claim 1, wherein the method comprises the steps of:
    a) inserting at least one preform of woven fibres and the identification medium into a mould, said at least one preform being made from electrically conductive fibres and non-electrically conductive fibres, the identification medium being located in an area of the preform comprising non-electrically conductive fibres, and
    b) injecting resin into the mould so as to simultaneously embed the preform and the identification medium.

* * * * *